US012744836B2

(12) United States Patent
Fox

(10) Patent No.: US 12,744,836 B2
(45) Date of Patent: Sep. 22, 2026

(54) METHOD AND SYSTEM FOR HIGH-VOLUME COMPRESSION OF IPV4 UNICAST ADDRESSES

(71) Applicant: FUGU SOLUTIONS, INC., Wilmington, DE (US)

(72) Inventor: Yancy Fox, Denver, CO (US)

(73) Assignee: FUGU SOLUTIONS, INC., Wilmington, DE (US)

( * ) Notice: Subject to any disclaimer, the term of this patent is extended or adjusted under 35 U.S.C. 154(b) by 80 days.

(21) Appl. No.: 18/749,613

(22) Filed: Jun. 21, 2024

(65) Prior Publication Data

US 2025/0030784 A1 Jan. 23, 2025

Related U.S. Application Data

(60) Provisional application No. 63/523,309, filed on Jun. 26, 2023.

(51) Int. Cl.
*H04L 69/04* (2022.01)
*H04L 61/5007* (2022.01)

(52) U.S. Cl.
CPC .......... *H04L 69/04* (2013.01); *H04L 61/5007* (2022.05)

(58) Field of Classification Search
CPC ............................ H04L 69/04; H04L 61/5007
USPC .......................................................... 709/247
See application file for complete search history.

(56) References Cited

U.S. PATENT DOCUMENTS 11,463,405 B2 10/2022 Moore et al.
11,602,450 B2 3/2023 Ramos et al.
11,609,889 B1 3/2023 Ling et al.
12,348,536 B1 * 7/2025 Lakshminarayanan ...................... H04L 63/1416
2006/0080444 A1 * 4/2006 Peddemors ........... H04L 63/101 709/227
2009/0285215 A1 11/2009 Kaippallimalil et al.
2010/0329247 A1 * 12/2010 Kennedy ................. H04L 25/49 375/259
2013/0198309 A1 * 8/2013 Muller .................... G06F 9/526 709/210
2013/0205035 A1 8/2013 Chen
2014/0282889 A1 * 9/2014 Ishaya ..................... H04L 63/10 726/4

OTHER PUBLICATIONS

AWS, "What is CIDR?", May 26, 2023, amazon, https://web.archive.org/web/20230526024527/https://aws.amazon.com/what-is/cidr/ (Year: 2023).*
Jarrod, "10 Simple Bzip2 Examples", May 31, 2023, rootusers.com, https://web.archive.org/web/20230531192346/rootusers.com/10-simple-bzip2-examples/ (Year: 2023).*

* cited by examiner

*Primary Examiner* — Ruolei Zong
(74) *Attorney, Agent, or Firm* — Kermit D. Lopez; Luis M. Ortiz

(57) ABSTRACT

A method and system for compressing IPv4 unicast addresses, can involve dividing one or more IPv4 unicast addresses among a group of IPv4 unicast addresses into a network portion and a host portion, grouping IPv4 unicast addresses into groups based on the network portion, summarizing the host portion of each group among the groups into a set of IPv4 unicast addresses, and encoding the groups in binary format, thereby resulting in a compression of the IPv4 unicast addresses into compressed IPv4 unicast addresses.

33 Claims, 6 Drawing Sheets

METHOD AND SYSTEM FOR HIGH-VOLUME COMPRESSION OF IPV4 UNICAST ADDRESSES

CROSS REFERENCE TO PROVISIONAL APPLICATION

This patent application claims priority under 35 U.S.C. § 119 to U.S. Provisional Patent Application Ser. No. 63/523,309 entitled "Method and System for High-Volume Compression of IPV4 Unicast Addresses," which was filed on Jun. 26, 2023, and is incorporated herein by reference in its entirety.

TECHNICAL FIELD

Embodiments are related to the field of network communications infrastructure such as large-scale data centers and cloud computing environments. Embodiments further relate to the compression of large-scale or IPv4 unicast addresses used in network infrastructure. Embodiments also relate to methods and systems for reducing the amount of data transmitted across a network to improve network performance. Embodiments further relate to the encoding and decoding of data.

BACKGROUND

IPv4 unicast addresses are a type of Internet Protocol (IP) version 4 (IPv4) address that identifies a single network interface card (NIC) attached to a device on a network. Unicast addresses are used to send packets to a specific destination host, unlike broadcast addresses that send packets to all hosts on a network or multicast addresses that send packets to a group of hosts.

IPv4 unicast addresses include four octets or 32 bits and are written in dotted decimal notation, where each octet represents a decimal number between 0 and 255. The first octet represents the network portion of the address, while the remaining three octets represent the host portion.

There are three classes of IPv4 unicast addresses: Class A, Class B, and Class C. Class A addresses are used for large networks with many hosts, Class B addresses are used for medium-sized networks, and Class C addresses are used for small networks.

In addition to the three classes, there are also private and public IPv4 unicast addresses. Private addresses are reserved for use in private networks and cannot be routed on the public internet, while public addresses are assigned by internet service providers (ISPs) and can be routed on the public internet.

IPv4 unicast addresses are essential for establishing connections between devices on a network and for enabling communication between hosts on different networks. IPv4 unicast addresses are used in many different applications, including email, file transfers, and web browsing, and are a fundamental component of the internet infrastructure.

IP lists, also known as IP address lists, are collections of IP addresses that are categorized based on their reputation, purpose, or other criteria. There are several types of IP lists, including blacklists, whitelists, and host files, that are commonly used in networking and cybersecurity.

Blacklists, also known as blocklists, are IP lists that contain IP addresses that are known to be malicious or have a history of being associated with spam, malware, or other types of cyber threats. Blacklists are commonly used by network administrators, email providers, and webmasters to block traffic from these IP addresses, prevent attacks, and improve network security.

Whitelists, on the other hand, are IP lists that contain IP addresses that are known to be trustworthy or have a history of being associated with legitimate traffic. Whitelists are used to allow traffic from these IP addresses and prevent false positives in security measures such as spam filters or firewalls.

Host files are a type of IP list that is used to resolve domain names to IP addresses. Host files are used by operating systems to map domain names to IP addresses and can be edited to add or remove entries. Host files can be used to block access to specific domains by mapping them to non-existent IP addresses or by mapping them to blacklisted IP addresses.

IP lists are an essential tool for network administrators and cybersecurity professionals to protect their networks and systems from cyber threats. By using IP lists, administrators can block traffic from malicious IP addresses, allow traffic from trusted sources and improve network performance and security.

Large IP lists, such as blacklists, whitelists, or host files, can significantly impact network performance due to the amount of data transmitted. In low-speed SCADA (Supervisory Control and Data Acquisition) networks, this issue can be more pronounced. Therefore, there is a need for an improved approach for compressing IPv4 unicast addresses to improve network performance. Several existing compression methods use non-binary encoding techniques cannot handle high-volume lists.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and Abstract as a whole.

It is, therefore, an aspect of the embodiments to provide for improved networking methods, systems and devices.

It is another aspect of the embodiments to provide for methods, systems, and devices for the compression of large-scale or high-volume IPv4 unicast addresses.

It is a further aspect of the embodiments to provide for methods and systems for reducing the amount of data transmitted across a network to improve network performance.

It is also an aspect of the embodiments to provide for methods and systems for high-volume compression of IPv4 unicast addresses.

The aforementioned aspects and other objectives and advantages can now be achieved as described herein. In an embodiment, a method for compressing IPv4 unicast addresses, can involve: dividing at least one IPv4 unicast address among a plurality of IPv4 unicast addresses into a network portion and a host portion; grouping the plurality of IPv4 unicast addresses into groups based on the network portion; summarizing the host portion of each group among the groups into a set of IPv4 unicast addresses; and encoding the groups in binary format, thereby resulting in a compression of the plurality of IPv4 unicast addresses into compressed IPv4 unicast addresses.

An embodiment can involve transmitting the compressed IPv4 unicast addresses across a network.

An embodiment can further involve decompressing the compressed IPv4 unicast addresses at a receiving end of the network.

In an embodiment, the set of IPv4 unicast addresses can comprise one or more of, for example, a blacklist, a whitelist, or a host file.

In an embodiment, the groups can be encoded in the binary format using an end-of-string delimiter to indicate the end of each host address.

In an embodiment, the groups can be further encoded with additional data after the each host address.

In an embodiment, the network portion of the IPv4 unicast address (or addresses) can be used as a key to group the plurality of IPv4 unicast addresses.

In an embodiment, the host portion of the IPv4 unicast address (or addresses) can be used as a value within the group.

In an embodiment, the size of a network mask of the network can be specified in a preamble to accommodate an IP list size.

In an embodiment, a method of improving the performance of a network, can involve: compressing a set of a plurality of IPv4 unicast addresses into compressed IPv4 unicast addresses; transmitting the compressed IPv4 unicast addresses across a network; and decompressing the compressed IPv4 unicast addresses at a receiving end of the network.

In an embodiment, the set of the plurality of IPv4 unicast addresses can comprise at least one of: a blacklist, a whitelist, or a host file.

In an embodiment, compressing the set of the plurality of IPv4 unicast addresses into compressed IPv4 unicast addresses, can further involve: dividing at least one IPv4 unicast address among the plurality of IPv4 unicast addresses into a network portion and a host portion; grouping the plurality of IPv4 unicast addresses into groups based on the network portion; summarizing the host portion of each group among the groups into a set of IPv4 unicast addresses; and encoding the groups in binary format, thereby resulting in the compressed IPv4 unicast addresses.

In an embodiment, a system for compressing IPv4 unicast addresses, can include: at least one processor and a memory, the memory storing instructions to cause the at least one processor to perform: dividing at least one IPv4 unicast address among a plurality of IPv4 unicast addresses into a network portion and a host portion; grouping the plurality of IPv4 unicast addresses into groups based on the network portion; summarizing the host portion of each group among the groups into a set of IPv4 unicast addresses; and encoding the groups in binary format, thereby resulting in a compression of the plurality of IPv4 unicast addresses into compressed IPv4 unicast addresses.

In an embodiment of the system, the instructions can be configured to cause the at least one processor to perform transmitting the compressed IPv4 unicast addresses across a network.

In an embodiment of the system, the instructions can be configured to cause the at least one processor to perform decompressing the compressed IPv4 unicast addresses at a receiving end of the network.

In an embodiment of the system, the set of IPv4 unicast addresses can comprise at least one of, for example, a blacklist, a whitelist, or a host file.

In an embodiment of the system, the groups can be encoded in the binary format using an end-of-string delimiter to indicate the end of each host address.

In an embodiment of the system, the groups can be further encoded with additional data after the each host address.

In an embodiment of the system, the network portion of the at least one IPv4 unicast address can be used as a key to group the plurality of IPv4 unicast addresses.

In an embodiment of the system, the host portion of the at least one IPv4 unicast address can be used as a value within the group.

In an embodiment of the system, the size of a network mask of the network can be specified in a preamble to accommodate an IP list size.

In an embodiment, a method for compressing IPv4 unicast addresses, can involve: dividing at least one IPv4 unicast address among a plurality of IPv4 unicast addresses into a network portion and a host portion; grouping the plurality of IPv4 unicast addresses into groups based on the network portion; summarizing the host portion of each group among the groups into a set of IPv4 unicast addresses; encoding the groups in binary format, thereby resulting in a compression of the plurality of IPv4 unicast addresses into compressed IPv4 unicast addresses; and transmitting the compressed IPv4 unicast addresses across a network.

An embodiment can further involve decompressing the compressed IPv4 unicast addresses at a receiving end of the network.

In an embodiment, the set of IPv4 unicast addresses can include one or more of, for example, a blacklist, a whitelist, and a host file.

In an embodiment, the groups can be encoded in the binary format using an end-of-string delimiter to indicate the end of each host address.

In an embodiment, the groups can be further encoded with additional data after the each host address.

In an embodiment, the network portion of the at least one IPv4 unicast address can be used as a key to group the plurality of IPv4 unicast addresses.

In an embodiment, the host portion of the at least one IPv4 unicast address can be used as a value within the group.

In an embodiment, the size of a network mask of the network can be specified in a preamble to accommodate an IP list size.

In an embodiment, a method for compressing IPv4 unicast addresses can involve: dividing an IPv4 unicast address into a network portion and a host portion; grouping the IPv4 addresses based on their network portion; summarizing the host portion of each group into a set; encoding the resulting groups in binary format, using an end-of-string delimiter to indicate the end of each host address and optionally including additional data after each host address; and transmitting the compressed IPv4 addresses across a network.

In an embodiment, the network portion of the IPv4 unicast address can be used as a key to group the addresses.

In an embodiment, the host portion of the IPv4 unicast address can be used as a value within the group.

In an embodiment, the size of the network mask can be specified in a preamble to accommodate IP list size.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

Like reference numerals or reference symbols in the various drawings indicate like or similar elements.

DETAILED DESCRIPTION

Figure 1:
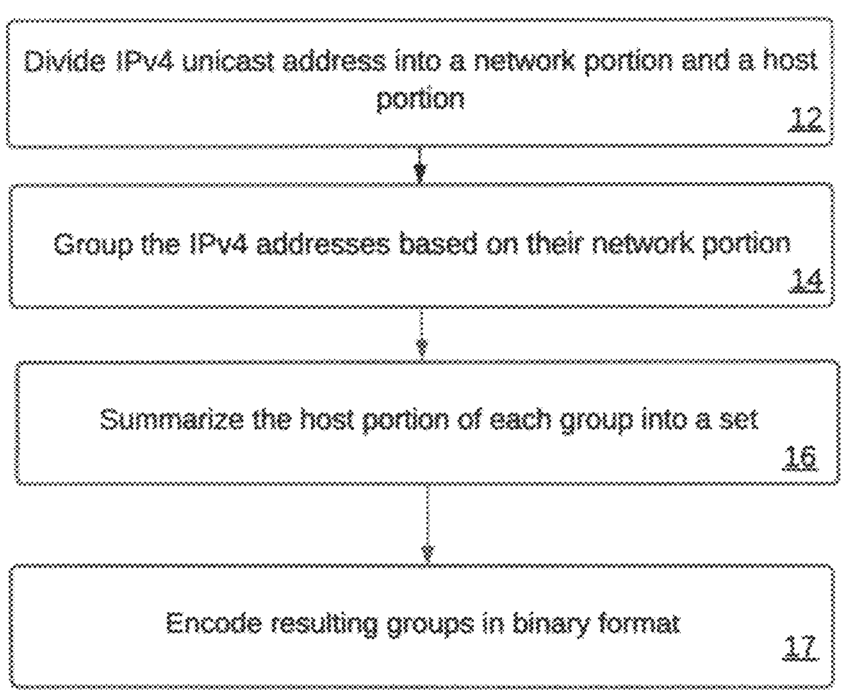
FIG. 1 illustrates a flow chart of operations depicting logical operational steps of a method for compressing IPv4 unicast addresses, in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Furthermore, the term "at least one" as utilized herein may be understood to convey "one or more". For example, "at least one widget" may convey "one or more widgets."

The term "data" as utilized herein can relate to physical signals that can indicate or include information. The term "data" may also relate to individual facts, statistics, or items of information, often numeric. In a more technical sense, data can be a set of values of qualitative or quantitative variables about one or more persons or objects, while a datum is a single value of a single variable. The term 'data' can also relate to the quantities, characters, and/or symbols on which operations can be performed by a computer, processor and/or application, with the data being stored and transmitted in the form of electrical signals and recorded on magnetic, optical, or mechanical recording media.

The term "IPv4 unicast address" as utilized herein can relate to a unique identifier assigned to a network interface of a device on a TCP/IP network. IPv4 unicast addresses can be used to identify a specific device on the network and to route data packets from one device to another. In a unicast transmission, a data packet can be sent from one sender to one receiver, and the destination address in the packet header can specify the unique IPv4 unicast address of the intended recipient. This is in contrast to multicast and broadcast transmissions, where a packet may be sent to multiple recipients simultaneously. An IPv4 unicast address can include four 8-bit numbers separated by periods, and can range from 0.0.0.0 to 255.255.255.255, with certain ranges reserved for specific purposes.

The term 'encoding' as utilized herein can relate to a process of converting information or data from one format, system, or representation to another. A goal of encoding is to make information more suitable for processing, transmission, storage, or presentation.

The term 'compression' as utilized herein can relate to a process of reducing the size of data by encoding it in a more compact format while maintaining its essential information. A goal of compression is to save storage space or reduce the time and resources required to transmit the data over a network or store it in memory.

In IPv4, an IP address is a 32-bit binary number, which can be represented in dotted-decimal notation, where each octet of the binary number is represented by its decimal equivalent. Encoding an IPv4 address, for example, may involve several different techniques, depending on the specific use case or application. Here are some examples:

Decimal encoding: Represent each octet of the IPv4 address as a decimal number, separated by periods. For example, the IPv4 address 192.168.1.1 can be represented as the decimal number 3232235777.

Binary encoding: Represent the IPv4 address as a 32-bit binary number. For example, the IPv4 address 192.168.1.1 can be represented in binary as 11000000.10101000.00000001.00000001.

Hexadecimal encoding: Represent the IPv4 address as a 32-bit hexadecimal number. For example, the IPv4 address 192.168.1.1 can be represented as the hexadecimal number C0A80101.

Base64 encoding: Convert the IPv4 address to a string of ASCII characters using the Base64 encoding scheme. For example, the IPv4 address 192.168.1.1 can be encoded as "wqAFAAE=".

It is worth noting that such encoding techniques may be used for specific purposes, such as compressing and transmitting IPv4 addresses over the network, or representing IPv4 addresses in databases or other data structures. A standard representation of an IPv4 address is dotted-decimal notation, which is easy to read and understand by humans.

In general, an IPv4 address is a 32-bit number, which corresponds to 4 bytes of data. Currently, it is not possible to encode an IPv4 address with less than 4 bytes of data without losing information.

As will be discussed in greater detail below, the embodiments relate to high-volume compression techniques, devices and systems for IPv4 unicast addresses that can use a binary encoding method. This approach can eliminate repetitive information from a group of non-contiguous addresses using set theory. Specifically, the IPv4 unicast address can be divided into two components: a network portion and a host portion. The network portion can be used as a key to group the addresses, and the host portion can be used as a value within the group. The resulting groups can be then encoded using a binary representation that can eliminate redundant information, resulting in a compressed representation of the IPv4 unicast addresses. This compression approach significantly reduces the size of IP lists, leading to faster data transmission and improved network performance.

FIG. 1 illustrates a flow chart of operations depicting logical operational steps of a method 10 for compressing IPv4 unicast addresses, in accordance with an embodiment. As depicted at block 12, a step or operation can be implemented to divide an IPv4 unicast address into a network portion and a host portion. The network portion identifies the network, while the host portion identifies the host or device on the network. Note that this step or operation can involve the division of one or more IPv4 unicast addresses based on each of their respective network portions.

Thereafter, as indicated at block 14, a step or operation can be implemented to group the IPv4 unicast addresses based on their network portion(s). Then, as shown at block 16, a step or operation can be implemented to summarize the host portion of each group into a set. Thereafter, as depicted at block 17, a step can be implemented to encode the resulting groups in binary format.

Note that the steps or operations shown at block 14 and block 16 involve grouping and summarizing. That is, the IPv4 unicast addresses can be grouped based on their network portion and an operation implemented to summarize the host information into a set. For example, the IP addresses 192.168.1.1, 192.168.1.100, and 192.168.1.200 all belong to the network 192.168.1.0/24. Using set theory, this set can be expressed as "192.168.1={1,100,200}." This set can be then expressed in a binary format by appending an additional bit to the end of each host address as an end-of-string delimiter. This approach also provides a mechanism to include optional data after each host address, which is defined in the preamble. The network mask size can also be specified in the preamble to accommodate IP list size. These features are discussed in greater detail below with respect to FIGS. 2-5.

Figure 2:
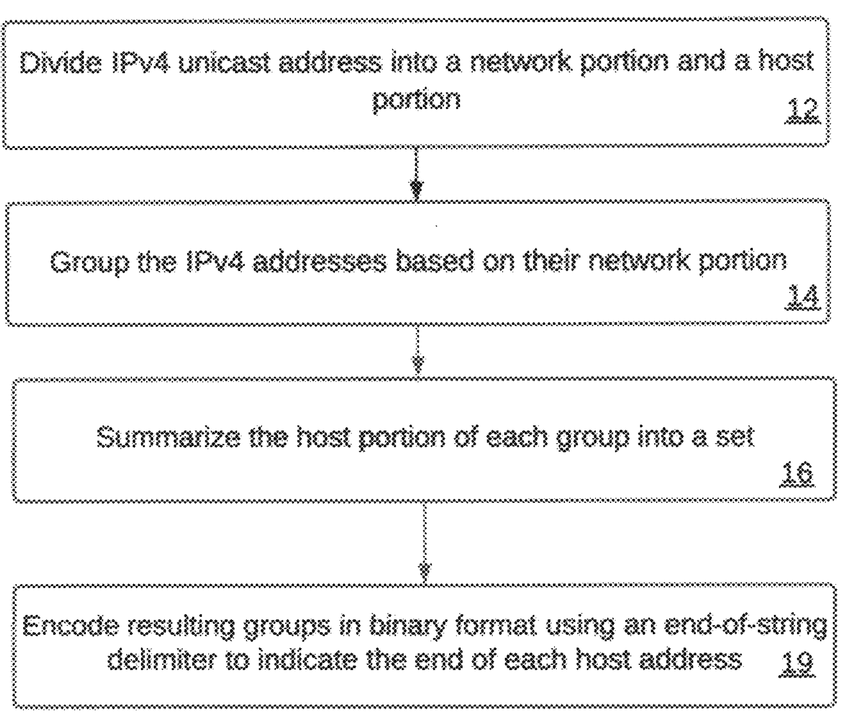
FIG. 2 illustrates a flow chart of operations depicting logical operational steps of a method for compressing IPv4 unicast addresses including encoding resulting groups in binary format using an end-of-string delimiter to indicate the end of each host address, in accordance with an embodiment.

FIG. 2 illustrates a flow chart of operations depicting logical operational steps of a method 11 for compressing IPv4 unicast addresses including encoding resulting groups in binary format using an end-of-string delimiter to indicate the end of each host address, in accordance with an embodiment. Note that the steps or operations of method 11 depicted in FIG. 2 are similar to those shown in FIG. 2, with a modification to block 18 of FIG. 1, which is reflected at block 19, which indicates that in some embodiments the step or operation of encoding the resulting groups in binary format can be performed using an end-of-string delimiter to indicate the end of each host address and optionally including additional data after each host address.

Figure 3:
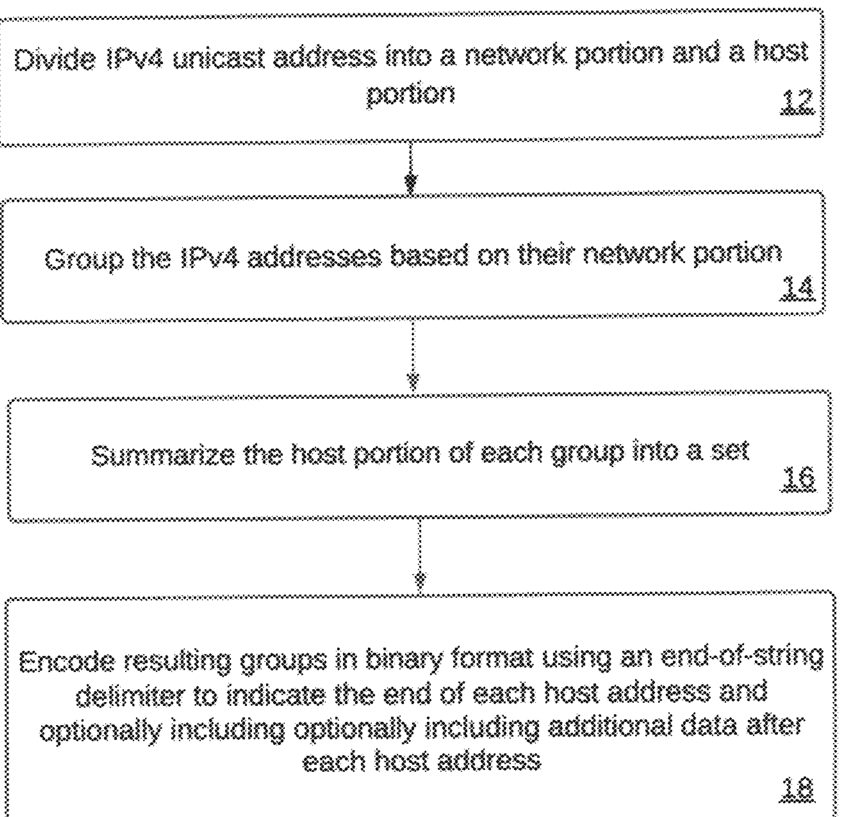
FIG. 3 illustrates a flow chart of operations depicting logical operational steps of a method for compressing IPv4 unicast addresses including optionally including additional data after each host address, in accordance with an embodiment.

FIG. 3 illustrates a flow chart of operations depicting logical operational steps of a method 13 for compressing IPv4 unicast addresses including optionally including additional data after each host address, in accordance with an embodiment. The method 13 shown in FIG. 3 is similar that of method 11 depicted in FIG. 2 and method 10 shown in FIG. 1, the difference being that the encoding operation is slightly different. That is, as shown at block 18 in FIG. 3, a step or operation can be implemented to encode the resulting groups in binary format, using an end-of-string delimiter to indicate the end of each host address and optionally including additional data after each host address.

Figure 4:
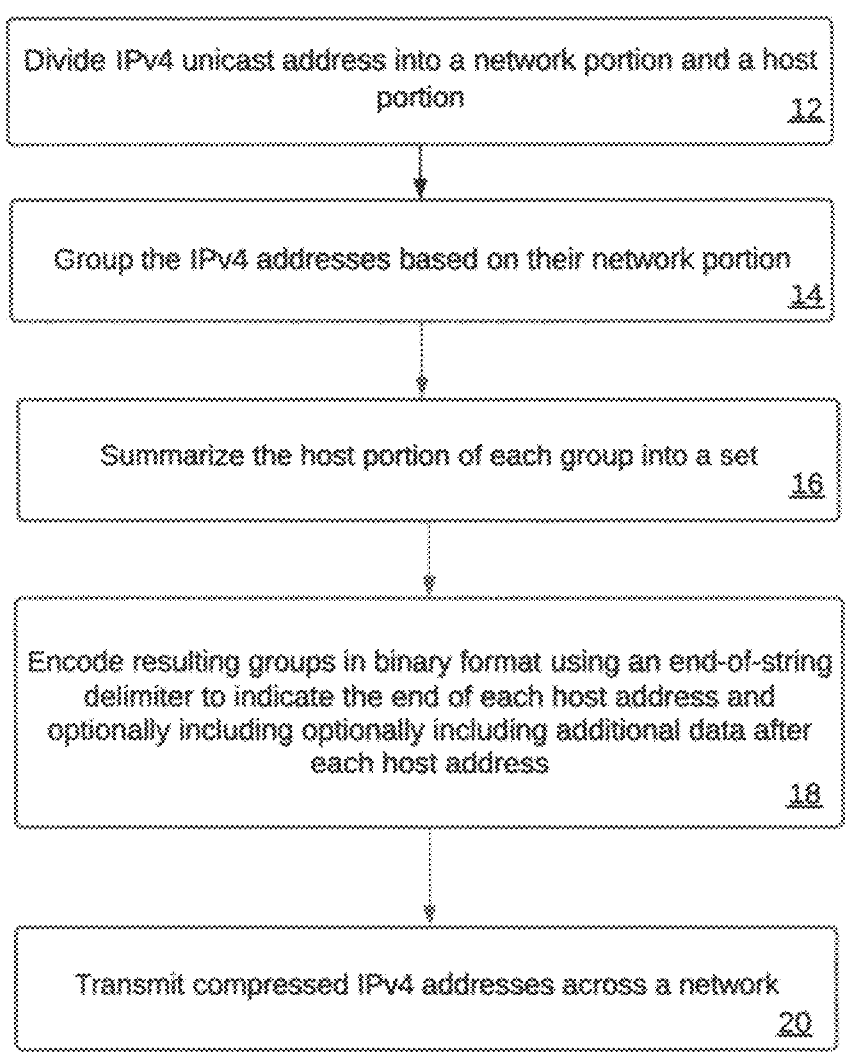
FIG. 4 illustrates a flow chart of operations depicting logical operational steps of a method for compressing IPv4 unicast addresses and transmitting compressed IPv4 unicast addresses across a network, in accordance with an embodiment.

FIG. 4 illustrates a flow chart of operations depicting logical operational steps of a method 15 for compressing IPv4 unicast addresses and transmitting compressed IPv4 unicast addresses across a network, in accordance with an embodiment. The method 15 shown in FIG. 4 is similar to the previously described methods, particularly the method 13 of FIG. 3 with the addition of the step or operation shown at block 20. That is, as depicted at block 20, a step or operation can be implemented to transmit the compressed IPv4 unicast addresses across a network.

Figure 5:
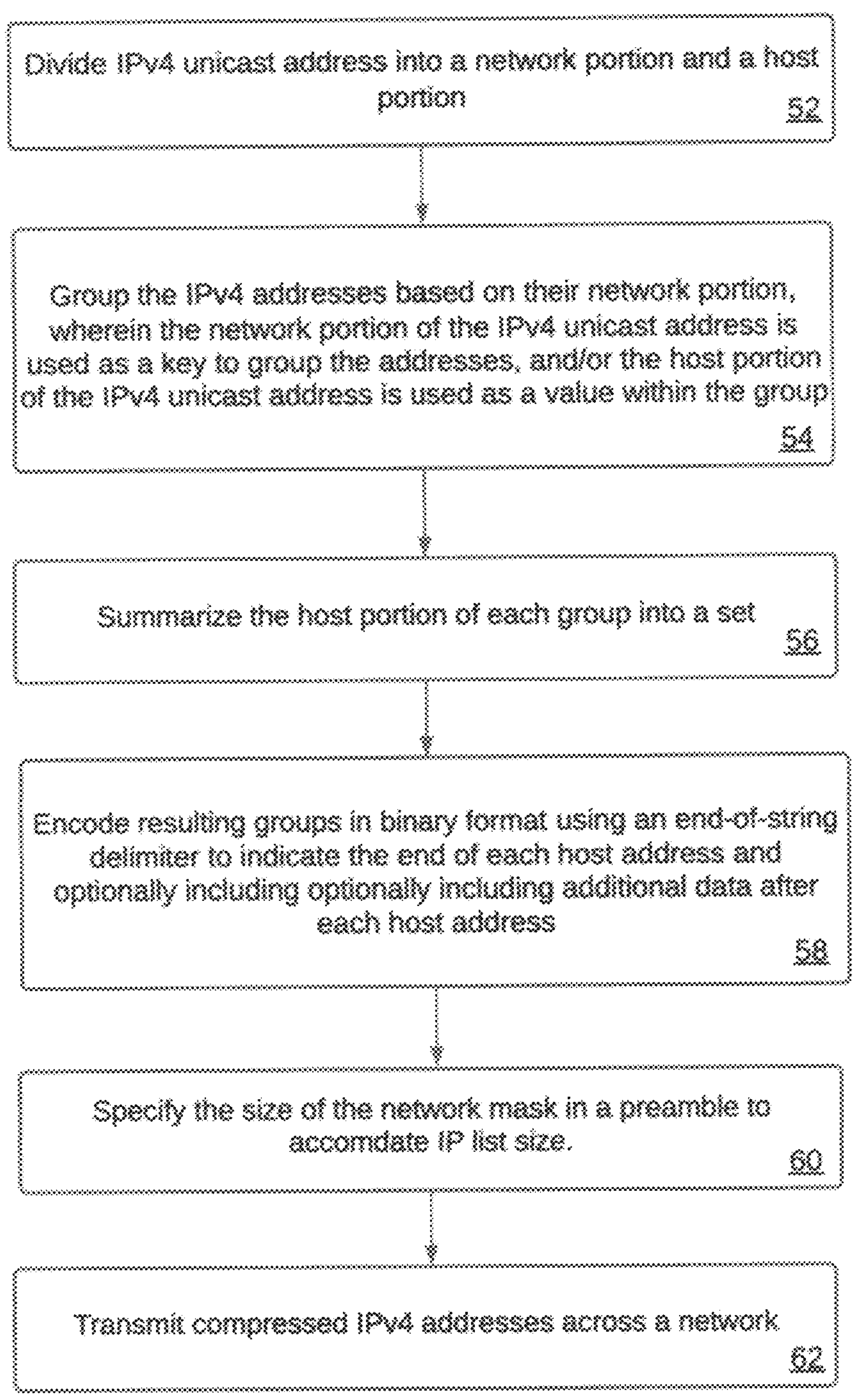
FIG. 5 illustrates a flow chart of operations depicting logical operational steps of a method for compressing IPv4 unicast addresses and transmitting compressed IPv4 unicast addresses across a network including, in accordance with an embodiment.

FIG. 5 illustrates a flow chart of operations depicting logical operational steps of a method 50 for compressing IPv4 unicast addresses and transmitting compressed IPv4 unicast addresses across a network including, in accordance with an embodiment. The method 50 depicted in FIG. 5 is similar to the various methodologies shown in FIGS. 1-4, with some additions and differences. As shown at block 50, a step or operation can be implemented to divide an IPv4 unicast address into a network portion and a host portion. Then, as indicated at block 54, a step or operation can be implemented to group the IPv4 unicast addresses based on their network portion. The network portion of the IPv4 unicast address can be used as a key to group the addresses, and the host portion of the IPv4 unicast address can be used as a value within the group.

Thereafter, as indicated at block 56, a step or operation can be implemented to summarize the host portion of each group into a set. Then, as shown at block 58, a step or operation can be implemented to encode the resulting groups in binary format, using an end-of-string delimiter to indicate the end of each host address and optionally including additional data after each host address. A step or operation can also be implemented as shown at block 60 wherein the size of the network mask is specified in a preamble to accommodate IP list size. Finally, as indicated at block 62, a step or operation can be implemented to transmit the compressed IPv4 unicast addresses across a network.

As can be appreciated by one skilled in the art, embodiments can be implemented in the context of a method, data-processing system, and/or computer program product. Accordingly, embodiments may take the form of a hardware embodiment, a software embodiment or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, optical storage devices, magnetic storage devices, server storage, databases, etc.

Computer program code for carrying out operations of the present invention may be written in an object oriented programming language (e.g., Java, C++, etc.) or another type of programming language. The computer program code, however, for carrying out operations of particular embodiments may also be written in procedural programming languages or in a visually oriented programming environment.

The program code may execute on a user's computer, partly on a user's computer, as a stand-alone software package, or partly on a user's computer and partly on a remote computer or on the remote computer. In the latter scenario, the remote computer may be connected to a user's computer through a bidirectional data communications network (e.g., a local area network (LAN), wide area network (WAN), wireless data network, a cellular network, etc.) or the bidirectional connection may be made to an external computer via most third party supported networks (e.g., through the Internet utilizing an Internet Service Provider).

The embodiments are described at least in part herein with reference to flowchart illustrations and/or block diagrams of methods, systems, and computer program products and data structures according to embodiments. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks. To be clear, the disclosed embodiments can be implemented in the context of, for example a special-purpose computer or a general-purpose computer, or other programmable data processing apparatus or system. For example, in some embodiments, a data processing apparatus or system can be implemented as a combination of a special-purpose computer and a general-purpose computer.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein. Examples of instructions means can include, for example, the various steps, operations or instructions shown in the various blocks in FIGS. 1-5 and elsewhere herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
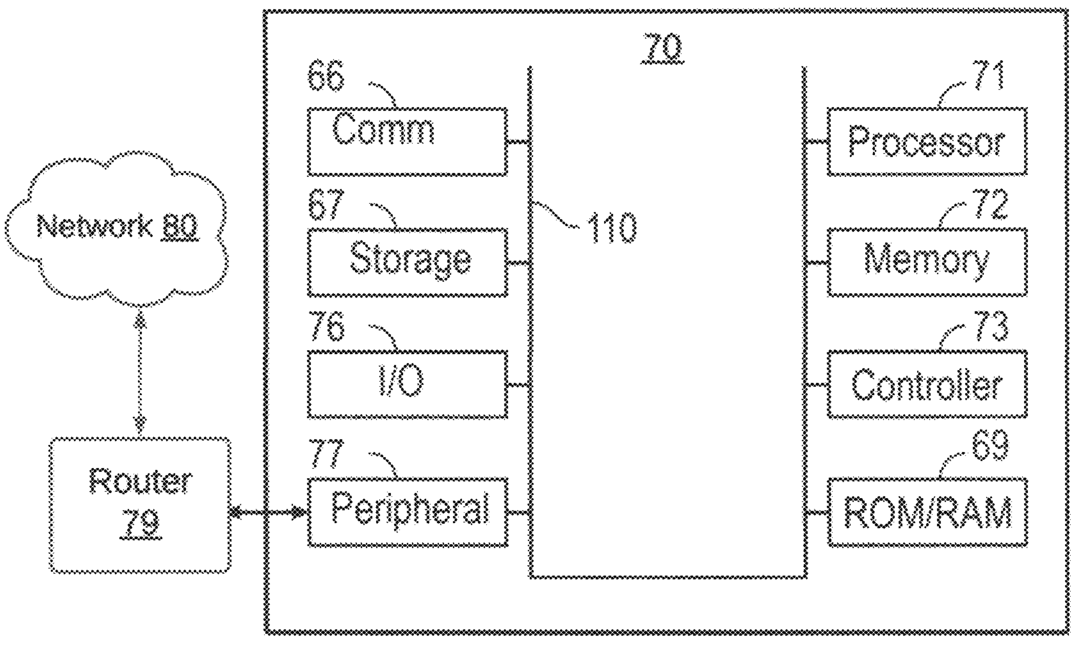
FIG. 6 illustrates a schematic view of a computer system, in accordance with an embodiment.
Figure 7:
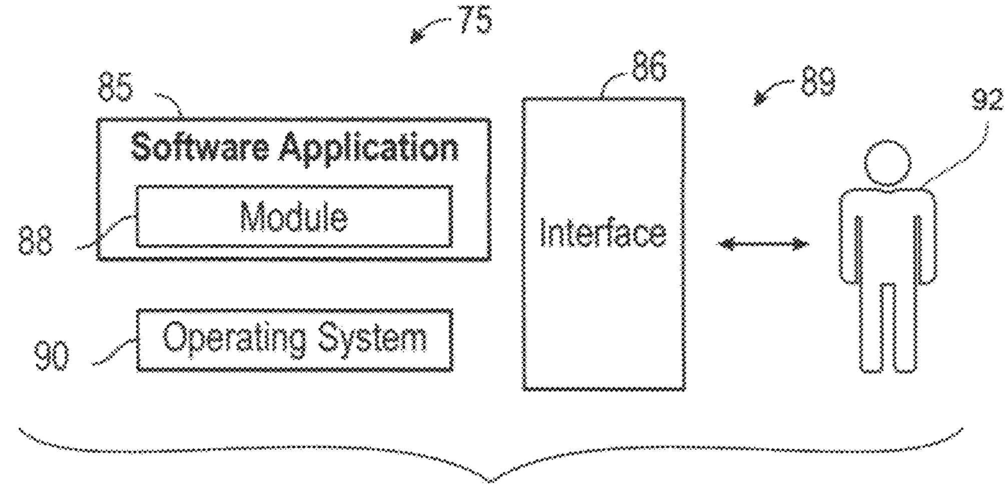
FIG. 7 illustrates a schematic view of a software system including a module, an operating system, and a user interface, in accordance with an embodiment.

FIG. 6 and FIG. 7 are shown only as exemplary diagrams of data-processing environments in which example embodiments may be implemented. It should be appreciated that FIG. 6 and FIG. 7 are only exemplary and are not intended to assert or imply any limitation with regard to the environments in which aspects or embodiments may be implemented. Many modifications to the depicted environments may be made without departing from the spirit and scope of the disclosed embodiments.

As illustrated in FIG. 6, some embodiments may be implemented in the context of a data-processing system 70 that can include, for example, one or more processors such as processor 71, which may be a CPU (Central Processing Unit) and/or another type of processor (e.g., a microprocessor, a microcontroller, etc.). The data-processing system 70 can further include a memory 72, a controller 73 (e.g., an input/output controller), and another memory such as ROM/RAM (Read Only Memory/Random Access Memory) 69. The data-processing system 70 can also include a peripheral connection 77 and an I/O (Input/Output) device 76. Note that the peripheral connection 77 can be implemented as one or more different types of peripheral connections such as, for example, a USB (Universal Serial Bus) connection/device, an ethernet connection/device, and so on.

The data-processing system 70 may include additional storage 67, which may function as a secondary storage and can be used as non-volatile storage of data and as an overflow data storage if needed and may also be used to store programs that are loaded into RAM when such programs are selected for execution. Note that RAM may be used to store volatile data and also to store instructions. The data-processing system 70 may additionally include a communications component 66 (shown as "Comm" in FIG. 6), which can provide for hardware, protocol stack processing, and interconnection capabilities that allow the processor 71 to communication with other modules or components within the data-processing system 70 or external to the data-processing system or within, for example, a cloud computing environment, as appropriate for a given implementation.

The communications component 66 may include any electrical, protocol, and protocol conversion capabilities useable to provide interconnection capabilities, as appropriate for a given implementation. As such, the communications component 66 represents a communications device capable of carrying out communications with other devices through wired and/or wireless communications. The communications component 66 may further include one or more wireless communications capabilities, as appropriate for a given implementation. The data-processing system 70 depicted in FIG. 6 is an example of an I/O computing system.

As illustrated, the various components of data-processing system 70 can communicate electronically through a system bus 110 or similar architecture. The system bus 110 may be, for example, a subsystem that transfers data between, for example, computer components within data-processing system 70 or to and from other data-processing devices, components, computers, etc.

The data-processing system 70 may be implemented in some embodiments as, for example, a server in a client-server based network (e.g., the Internet) or in the context of a client and a server (i.e., where aspects are practiced on the client and the server). In some example embodiments, data-processing system 70 may be, for example, a standalone desktop computer, a laptop computer, a Smartphone, a tablet computing device, a networked computer server, and so on, wherein each such device can be operably connected to and/or in communication with a client-server based network or other types of networks (e.g., cellular networks, Wi-Fi, etc.). The data-processing system 70 may communicate with a network 80 through a router 79.

Note that the router 79 can function as a networking device that can connect multiple computer networks together and routes data between them. The primary function of router 79 is to determine the best path for data to travel from one network to another. The router 70 may be a wired router or a wireless router. A wired router typically uses Ethernet cables to connect devices together in a network. A wired router may have Ethernet ports that allow devices such as computers, printers, and other devices to connect to the network via wired connections. The wired router also may include a WAN (Wide Area Network) port to connect to an Internet Service Provider (ISP) for Internet access.

A wireless router, on the other hand, uses radio waves to connect devices together in a network. It has wireless antennas that allow devices such as laptops, smartphones, and tablets to connect to the network via Wi-Fi. It also has Ethernet ports and a WAN port for wired connections and Internet access. In addition to routing data between networks, routers also provide security features such as firewalls, Network Address Translation (NAT), and Virtual Private Network (VPN) support to protect the network and its devices from unauthorized access. The router 79 connects devices and networks such as network 80, facilitating data transfer, and ensuring the security of the network 80 and/or the security of the connection to the network 80.

Note that the network 80 may be a cloud computing platform that can provide a wide range of infrastructure services, including networking, compute, storage, and databases, among others. Such a network can use a global network of data centers to provide high availability and low-latency access to its services. Such a network architecture for network 80 can be designed to provide customers with flexibility, scalability, and security. It can be built on top of a scalable network infrastructure that is designed to handle massive amounts of data traffic and provide low-latency connectivity between different regions and zones. A non-limiting example of such a cloud computing platform is Amazon Web Services (AWS) and its Amazon Virtual Private Cloud (VPC). The network 80, however, can be simply the Internet.

In some embodiments, the data-processing system 70 can be, for example, a computer server and/or a desktop computer, a laptop computer, a mobile computing device (e.g., a smartphone, tablet computing device) and so on. In some embodiments the data-processing system 70 may be implemented as a single-board computer (SBC) onto a single printed circuit board (PCB). In such an SBC implementation, the data-processing system 70 can contain all the essential components required to run a computer, such as a central processing unit (CPU), memory, input/output interfaces, storage, and power supply. A SBC may be implemented in a small form factor, often comparable in size to a credit card or a small piece of bread. It can include a variety of different connectors, such as USB ports, Ethernet ports, HDMI or VGA outputs, audio jacks, and GPIO (General Purpose Input/Output) pins, which can allow the computer to interact with various external devices and sensors.

FIG. 7 illustrates a computer software system 75 for directing the operation of the data-processing system 70 depicted in FIG. 6. Software application 85, stored for example in the memory 72 of the data-processing system 70 can generally include one or more modules, an example of which is a module 88. The computer software system 75 also can include a kernel or operating system 90 and a shell or interface 86, which may include, for example, the previously discussed user interfaces. One or more application programs, such as the software application 85, may be "loaded" (e.g., transferred from, for example, mass storage or another memory location into the memory 72) for execution by the data-processing system 70.

The data-processing system 70 can receive inputs including one or more user commands and data through the interface 86. These inputs may then be acted upon by the data-processing system 70 in accordance with instructions from the operating system 90 and/or the software application 85. The interface 86 (e.g., a user interface, a GUI (Graphical User Interface), etc.) in some embodiments can serve to display results, whereupon a user (shown at the right hand side of FIG. 5) may supply additional inputs or can terminate a session. The software application 85 can include module(s) 88, which can, for example, implement instructions or operations such as, for example, the steps, operations or instructions shown and described herein with respect to the various blocks illustrated and described herein with respect to FIGS. 1-5. The module 88 may also be composed of a group of modules and/or sub-modules.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" can constitute a software application, but can also be implemented as both software and hardware (i.e., a combination of software and hardware). A module may also refer to a "course module" facilitated by a software application/module, which may also be referred to as a program module.

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein refers to a collection of routines and data structures that can perform a particular task or implement a particular data type. A module may be composed of two parts: an interface, which can list the constants, data types, variable, and routines that can be accessed by other modules or routines, and an implementation, which may be private (e.g., accessible only to that module) and which can include source code that actually implements the routines in the module. The term module can also refer to an application, such as a computer program designed to assist in the performance of a specific task, such as word processing, accounting, inventory management, etc. A module may also refer to a physical hardware component or a combination of hardware and software.

Based on the foregoing, it can be appreciated that the embodiments can provide a high-volume compression method and system and devices thereof for IPv4 unicast addresses using a binary encoding method. This approach can eliminate repetitive information from a group of non-contiguous addresses using set theory. Specifically, the IPv4 unicast address can be divided into two components: the network portion and the host portion. The network portion can be used as a key to group the addresses, and the host portion is used as a value within the group. The resulting groups can be then encoded using a binary representation that eliminates redundant information, resulting in a compressed representation of the IPv4 unicast addresses. This compression approach can significantly reduce the size of IP lists, leading to faster data transmission and improved network performance.

As discussed previously, the compression approach begins by dividing the IPv4 unicast address into the network portion and the host portion. The network portion identifies the network, while the host portion identifies the host or device on the network. The method groups the IPv4 unicast addresses based on their network portion and summarizes the host information into a set. For example, the IP addresses 192.168.1.1, 192.168.1.100, and 192.168.1.200 all belong to the network 192.168.1.0/24. Using set theory, this set can be expressed as "192.168.1={1,100,200}." This set can then be expressed in a binary format by appending an additional bit to the end of each host address as an end-of-string delimiter. The embodiments can also provide a mechanism to include optional data after each host address, which is defined in the preamble. The network mask size can also be specified in the preamble to accommodate IP list size.

The embodiment can provide for a wide range of applications in networking, including cybersecurity and SCADA systems. The embodiments are especially useful in situations where large IP lists need to be transmitted across a network, and network performance is critical. The embodiments are also beneficial in low-speed SCADA networks and other networks where data transmission speed is a limiting factor. The binary encoding approach of the embodiments can provide for a significant improvement in IP list compression over existing techniques, making it a valuable tool in the field of networking.

The embodiments provides several advantages over existing compression techniques. The binary encoding approach used in the embodiments can result in a more efficient compression of IP lists, reducing the size of the data transmitted and improving network performance. The embodiments can handle high-volume lists and is scalable, making them suitable for large-scale networks. The embodiments are also flexible, allowing optional data to be included after each host address, and the network mask size to be specified in the preamble. Overall, the embodiments can provide for an effective solution for compressing high-volume IPv4 unicast addresses.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

The various operations of methods, systems and devices described above may be performed by any suitable means capable of performing the operations, such as various hardware and/or software component(s), circuits, and/or module(s). Generally, any operations illustrated in the figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. An example of such processors, microprocessors and so on include the processor 71 shown in FIG. 6.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in, for example, memory such as Random Access Memory (RAM), flash memory, Read Only Memory (ROM), Electrically Programmable ROM (EPROM), Electrically Erasable Programmable ROM (EEPROM), registers, hard disk, a removable disk, or any other form of storage medium known in the art. A storage medium can be coupled to the processor such that the processor can read information from, and write information to, the storage medium. In the alternative, the storage medium may be integral to the processor. Combinations of the above should also be included within the scope of computer readable media. The processor and the storage medium may reside in, for example, an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment. Thus, the invention may be embodied or carried out in a manner that achieves or optimizes one advantage or group of advantages as taught herein without necessarily achieving other advantages as may be taught or suggested herein.

The systems, methods, and acts described in the examples presented previously are illustrative, and, alternatively, certain acts can be performed in a different order, in parallel with one another, omitted entirely, and/or combined between different examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for compressing IPv4 unicast addresses, comprising:

dividing, by at least one processor, at least one IPv4 unicast address among a plurality of IPV4 unicast addresses into a network portion and a host portion;

grouping, by at least one processor, the plurality of IPV4 unicast addresses into groups based on the network portion, wherein the network portion is used as a key for the grouping;

summarizing, by at least one processor, the host portion of each group among the groups into a set of IPV4 unicast addresses, wherein the host portion is represented as a set of host values associated with the key;

encoding, by at least one processor, the groups in a binary format, thereby resulting in a compression of the plurality of IPV4 unicast addresses into compressed IPv4 unicast addresses; and transmitting the compressed IPv4 unicast addresses across a network to reduce network bandwidth utilization and improve transmission efficiency.

2. The method of claim 1 wherein the binary format comprises a data structure that (i) represents each group as the network portion and the associated set of host values, (ii) uses an end-of-string delimiter to indicate termination of each host value, and (iii) includes additional data associated with each host value.

3. The method of claim 1 further comprising decompressing the compressed IPv4 unicast addresses at a receiving end of the network.

4. The method of claim 1 wherein the set of IPV4 unicast addresses comprises at least one of: a blacklist, a whitelist, or a host file.

5. The method of claim 1 wherein the groups are encoded in the binary format using an end-of-string delimiter to indicate the end of each host address.

6. The method of claim 5 wherein the groups are further encoded with additional data after the each host address.

7. The method of claim 1, wherein:

the network portion of the at least one IPv4 unicast address is used as a key to group the plurality of IPV4 unicast addresses; and each group among the groups comprises a key-value data structure in which the network portion is the key and a set of host values corresponding to the plurality of IPV4 unicast addresses sharing the network portion are stored as values associated with the key.

8. The method of claim 1, wherein the host portion of the at least one IPv4 unicast address is used as a value within the group.

9. The method of claim 1, wherein the size of a network mask of the network is specified in a preamble to accommodate an IP list size.

10. A method of improving a performance of a network, comprising:

compressing a set of a plurality of IPV4 unicast addresses into compressed IPv4 unicast addresses, by at least one processor, wherein compressing comprises grouping the plurality of IPv4 unicast addresses based on a shared portion of the IPV4 unicast addresses and encoding the grouped IPv4 unicast addresses into a binary representation;

transmitting the compressed IPv4 unicast addresses across a network; and decompressing the compressed IPv4 unicast addresses at a receiving end of the network.

11. The method of claim 10, wherein:

the set of the plurality of IPV4 unicast addresses comprises at least one of: a blacklist, a whitelist, or a host file; and wherein the set comprises a plurality of non-contiguous host portions aggregated within each group.

12. The method of claim 10 wherein compressing the set of the plurality of IPV4 unicast addresses into compressed IPv4 unicast addresses, comprises:

dividing at least one IPv4 unicast address among the plurality of IPV4 unicast addresses into a network portion and a host portion;

grouping the plurality of IPV4 unicast addresses into groups based on the network portion;

summarizing the host portion of each group among the groups into a set of IPV4 unicast addresses, wherein the set comprises a plurality of non-contiguous host portions aggregated within each group among the groups; and encoding the groups in binary format, thereby resulting in the compressed IPV4 unicast addresses.

13. A system for compressing IPv4 unicast addresses, comprising:

at least one processor and a memory, the memory storing instructions to cause the at least one processor to perform:

dividing at least one IPv4 unicast address among a plurality of IPV4 unicast addresses into a network portion and a host portion;

grouping the plurality of IPV4 unicast addresses into groups based on the network portion, wherein the network portion is used as a key for the grouping;

summarizing the host portion of each group among the groups into a set of IPv4 unicast addresses, wherein the host portion is represented as a set of host values associated with the key; and encoding the groups in binary format, thereby resulting in a compression of the plurality of IPV4 unicast addresses into compressed IPv4 unicast addresses, wherein the binary format comprises a data structure representing each group as the network portion and the associated set of host values.

14. The system of claim 13 wherein the instructions further cause the at least one processor to perform transmitting the compressed IPv4 unicast addresses across a network.

15. The system of claim 14 wherein the instructions further cause the at least one processor to perform decompressing the compressed IPv4 unicast addresses at a receiving end of the network.

16. The system of claim 13 wherein the set of IPV4 unicast addresses comprises at least one of: a blacklist, a whitelist, or a host file.

17. The system of claim 13 wherein the groups are encoded in the binary format using an end-of-string delimiter to indicate the end of each host address.

18. The system of claim 17 wherein the groups are further encoded with additional data after the each host address.

19. The system of claim 13, wherein the network portion of the at least one IPv4 unicast address is used as a key to group the plurality of IPV4 unicast addresses.

20. The system of claim 13, wherein the host portion of the at least one IPv4 unicast address is used as a value within the group.

21. The system of claim 13, wherein the size of a network mask of the network is specified in a preamble to accommodate an IP list size.

22. A method for compressing IPv4 unicast addresses, comprising:

dividing, by at least one processor, at least one IPv4 unicast address among a plurality of IPV4 unicast addresses into a network portion and a host portion;

grouping, by at least one processor, the plurality of IPV4 unicast addresses into groups based on the network portion, wherein the network portion is used as a key for the grouping;

summarizing, by at least one processor, the host portion of each group among the groups into a set of IPV4 unicast addresses, wherein the host portion is represented as a set of host values associated with the key; and encoding, by at least one processor, the groups in binary format, thereby resulting in a compression of the plurality of IPV4 unicast addresses into compressed IPv4 unicast addresses, wherein the binary format comprises a data structure representing each group as the network portion and the associated set of host values; and transmitting the compressed IPv4 unicast addresses across a network to reduce network bandwidth utilization and improve transmission efficiency.

23. The method of claim 22 further comprising decompressing the compressed IPv4 unicast addresses at a receiving end of the network.

24. The method of claim 22 wherein the set of IPv4 unicast addresses comprises at least one of: a blacklist, a whitelist, or a host file.

25. The method of claim 22 wherein the groups are encoded in the binary format using an end-of-string delimiter to indicate the end of each host address.

26. The method of claim 25 wherein the groups are further encoded with additional data after the each host address.

27. The method of claim 22, wherein the network portion of the at least one IPv4 unicast address is used as a key to group the plurality of IPV4 unicast addresses.

28. The method of claim 22, wherein the host portion of the at least one IPv4 unicast address is used as a value within the group.

29. The method of claim 22, wherein the size of a network mask of the network is specified in a preamble to accommodate an IP list size.

30. A method for compressing IPv4 unicast addresses comprising:

dividing, by at least one processor, an IPV4 unicast address into a network portion and a host portion;

grouping, by at least one processor, the IPv4 addresses based on their network portion, wherein the network portion is used as a key for the grouping;

summarizing, by at least one processor, the host portion of each group into a set, wherein the set comprises host values associated with the key;

encoding, by at least one processor, the resulting groups in binary format, wherein the binary format comprises a data structure representing each group as the network portion and the associated set of host values, using an end-of-string delimiter to indicate the end of each host address and optionally including additional data after each host address; and transmitting the compressed IPv4 addresses across a network to reduce network bandwidth utilization and improve transmission efficiency.

31. The method of claim 30, wherein the associated set of host values comprises a plurality of non-contiguous host portions aggregated based on the key.

32. The method of claim 30, wherein the host portion of the IPV4 unicast address is used as a value within the group.

33. The method of claim 30, wherein the size of the network mask is specified in a preamble to accommodate IP list size.

* * * * *